Figure 6:
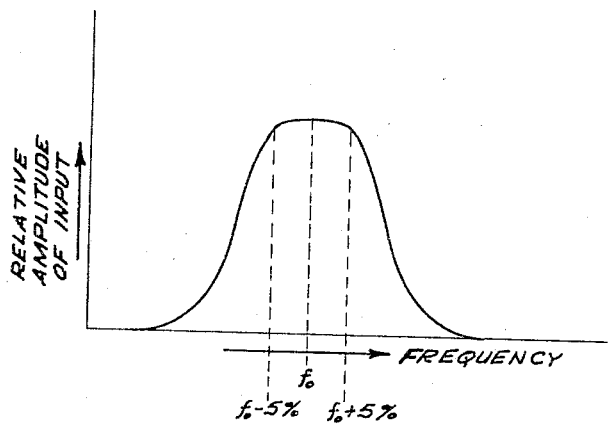

June 13, 1967 C. A. SHEARER ETAL 3,325,753
BAND PASS FILTER
Filed April 19, 1963 2 Sheets-Sheet 1
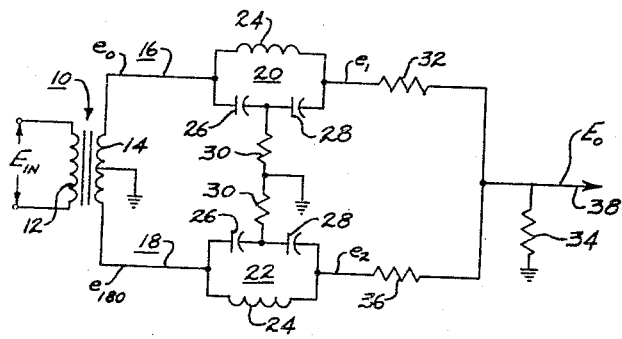
Fig. 1
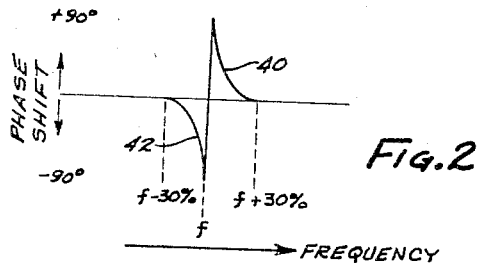
Fig. 2
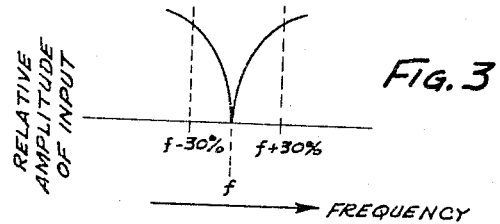
Fig. 3
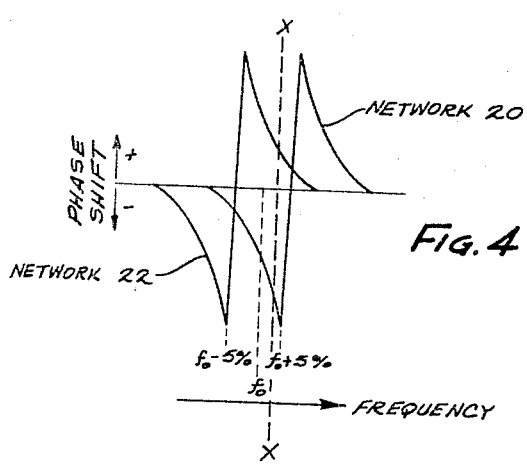
Fig. 4
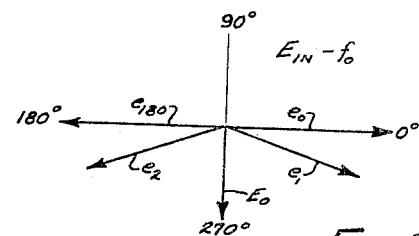
Fig. 5A
Fig. 5B
Fig. 5C
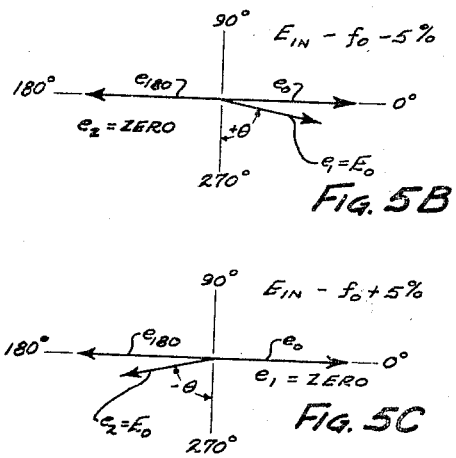
Fig. 5D
INVENTORS
CHARLES A. SHEARER &
GLEN H. THOMAS
BY
ATTORNEY June 13, 1967   C. A. SHEARER ET AL   3,325,753
BAND PASS FILTER Filed April 19, 1963   2 Sheets-Sheet 2

INVENTORS
CHARLES A SHEARER &
BY GLEN H. THOMAS

ATTORNEY

United States Patent Office 3,325,753
Patented June 13, 1967

3,325,753
BAND PASS FILTER
Charles A. Shearer, Westerville, and Glen H. Thomas, Columbus, Ohio, assignors to International Research and Development Corporation, Worthington, Ohio, a corporation of Ohio
Filed Apr. 19, 1963, Ser. No. 274,146
5 Claims. (Cl. 333—75)

This invention relates to filter circuits adapted to pass a predetermined band of frequencies, and more particularly to a band pass filter with a wide pass band which can be employed at low frequencies. The present filter is of especial value for input signals which are contaminated with undesired frequency components and also having a desired frequency component which fluctuates over an incremental range from its mean frequency.

Although not limited thereto, the present invention is particularly adapted for use in electronic vibration analyzing equipment for internal combustion engines and other similar devices where the speed of moving parts cannot be accurately maintained at a fixed value. Such vibration analyzing equipment is shown and described, for example, in copending application Ser. No. 196,351, filed May 21, 1962, and assigned to the assignee of the present application. By reference to that application, it will be appreciated that when two or more sources of unbalance are present in a single piece of equipment to be balanced and are generating vibrations at different frequencies, it becomes necessary to employ a filter which will separate a particular frequency representative of a single source of vibrations from all other frequencies. Circuitry for accomplishing this function is termed a band pass filter and forms the subject of the present invention.

The vibration frequencies mentioned above may be in the range of about twenty to thirty cycles per second, meaning that the filter must be suitable for such applications. Furthermore, in cases where the vibrational frequency of a vibrating body varies as in an internal combustion engine, the filter must pass a band of frequencies equal to about 5% of the center frequency on either side of that center frequency. Thus, if the center frequency of the filter is twenty-five cycles per second, it must pass a band of frequencies varying between about twenty-four and twenty-six cycles per second. Finally, the signal at the output of the filter must be shifted 90° in phase with respect to the input signal in order to satisfy the requirements of the analyzing equipment.

In the past, filters used in the aforesaid analyzing equipment consisted of a plurality of feedback amplifiers each incorporating a twin-T filter network in a negative feedback loop, the twin-T network being tuned to the frequency of a desired pass band. With this arrangement, the negative feedback signal attenuates input signals applied to the amplifier at all frequencies other than the selected frequency to which the twin-T network is tuned. A broad pass band is obtained by employing three negative feedback amplifiers of the type described above, one of which is tuned to the center frequency of the desired band pass, the second of which is tuned to a frequency on one side of the center frequency, and the third of which is tuned to a frequency on the other side of the center frequency. Needless to say, the necessity for three amplifiers involves a relatively large number of circuit components. Further, since the designated amplifiers incorporate direct current coupling, the phase shift characteristics of the filter will vary as the mutual conductance and amplification characteristics of the amplifier vacuum tubes vary. After the signal passes through such a filter, it is still necessary to pass it through a phase shift network to obtain the necessary 90° phase shift mentioned above. It can thus be seen that the prior art filters described above, although workable, had certain inherent disadvantages and were relatively complicated and expensive.

The principal objects of the invention include:
To provide new and improved band pass filter means adapted to pass a relatively wide band of frequencies while requiring less input power than previous filters of this type;
To provide a band pass filter adapted to pass a relatively wide band of frequencies and which is cheaper and less complicated in construction than previous filters of this type in that vacuum tubes and transistors are eliminated;
To provide a band pass filter adapted to produce an output signal which is shifted in phase with respect to an input signal by 90°; and
To provide a band pass filter having a more uniform frequency response and better rejection characteristics outside the pass band.

In accordance with the invention, the band pass filter means comprises a pair of signal channels, means for applying an input signal to both of said channels such that the signal in one channel is 180° out of phase with respect to that in the other channel, a band rejection filter in each of the channels, and means for electrically combining the signals in the channels after passage through said band rejection filters to produce an output signal. Preferably, the rejection filter in each channel is of the bridge-T type with one rejection filter being tuned to a frequency $f_0 + x\%$ of $f_0$ and the other rejection filter being tuned to the frequency $f_0 - x\%$ of $f_0$ where $x$ is a function of the desired band width of the filter and $f_0$ is the center frequency of the desired pass band. Since each bridge-T filter network in the respective channels will attenuate only those signals approximating the frequency to which it is tuned, and since the outputs of the bridge-T networks are combined in subtractive relationship, only those signals in the range of $f_0$ plus and minus $x\%$ of $f_0$ will appear at the output of the band pass filter configuration. That is, only those signals which do not simultaneously pass through the bridge-T networks in the respective signal channels will appear at the output.

Figure 7:
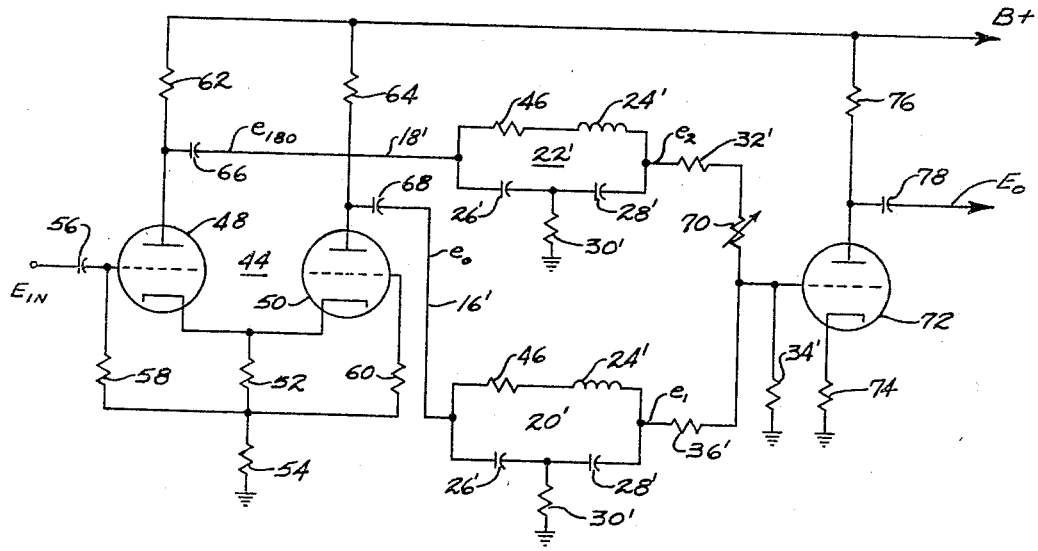

The above and other objects and features of the invention will become apparent from the following detailed description taken in connection with the accompanying drawings which form a part of this specification and in which:

FIGURE 1 is a schematic circuit diagram of one embodiment of the invention;
FIG. 2 is a graph illustrating the phase shift characteristics of the bridge-T filter networks employed in the circuit of FIG. 1;
FIG. 3 is a graph illustrating the attenuation characteristics of the bridge-T filter networks employed in the circuit of FIG. 1;
FIG. 4 is a graph illustrating the relationship of the phase shift curves of the respective bridge-T filter networks employed in the circuit of FIG. 1;
FIGS. 5A–5D are vector diagrams showing the relationship of input and output voltages in the circuit of FIG. 1 at various input frequencies;
FIG. 6 is a graph illustrating the response of the filter circuit of FIG. 1; and
FIG. 7 is a detailed schematic circuit diagram of another embodiment of the invention employing a phase splitter at the input to the filter and an amplifier at its output.

Referring now to the drawings, and more particularly to FIG. 1, the filter circuit shown includes an input transformer 10 having a primary winding 12 adapted for connection to a source of alternating current voltage, identified as $E_{in}$. The transformer 10 has a secondary widning 14 with a center tap connected to ground as shown.

The opposite ends of the secondary winding 14 are connected to signal channels identified by the numerals 16 and 18, respectively. Included in the channel 16 is a first bridge-T filter network 20; and, in a similar manner, a bridge-T filter network 22 is included in the channel 18. Each bridge-T filter network comprises an inductor 24 connected in shunt with a pair of series-connected capacitors 26 and 28, the junction of the capacitors being connected to ground through a resistor 30.

The output of filter 20 is connected through resistor 32 to a summing resistor 34. In a similar manner, the output of filter network 22 is connected through resistor 36 to the same summing resistor 34, the arrangement being such that the voltages $e_1$ and $e_2$ will be vectorially added across the summing resistor 34 to provide an output voltage on lead 38 identified as $E_0$.

With the center tapped secondary winding arrangement of transformer 10, the voltage in channel 16, $e_0$, will be 180° out of phase with respect to signal $e_{180}$ in channel 18. The phase shift characteristics of each of the filter networks 20 and 22 are shown in FIG. 2, and it will be noted that immediately above and below the center frequency $f$, the phase shift increases very rapidly to +90° and −90° respectively. Thereafter, the phase shift decreases along the curves 40 and 42 such that at frequencies of about $f+30\%$ and $f-30\%$ the phase shift is practically zero for large values of Q.

With reference to FIG. 3, it can be seen that at the signal frequency $f$, the amplitude attenuation of the input signal is at a maximum and decreases on either side of the center frequency $f$ until frequencies $f+30\%$ and $f-30\%$ are reached where the attenuation is practically nil. Thus, at the center frequency $f$ of each of the bridge-T networks 20 and 22 the phase shift is zero and the output is also at a minimum. As the frequency varies above and below the center frequency $f$, the phase shift rapidly increases and then decreases while the attenuation of the signal gradually decreases until points are reached on either side of the center frequency where the attenuation and phase shift values are both substantially zero.

As was mentioned above, it is desirable in certain vibration analyzing applications to provide a filter having a pass band which varies in frequency by an amount equal to plus or minus 5% of the center frequency to which the filter is tuned. Accordingly, the filter network 20 in FIG. 1 may, for example, be tuned to the frequency $f_0+5\%$ where $f_0$ is the center frequency of the band pass filter; and the filter 22 may be tuned to the frequency $f_0-5\%$. That is, network 20 is tuned to $f_0+.05 f_0$, and network 22 is tuned to $f_0-.05 f_0$. The resulting phase shift characteristics of the two filter networks 22 and 24 are shown in FIG. 4. It will be noted that at the frequency $f_0$, the one filter 20 will produce a negative phase shift while the other filter 22 tuned to the frequency $f_0-5\%$ will produce a positive phase shift.

By combining the voltages $e_1$ and $e_2$ at the outputs of filters 20 and 22, respectively, across the summing resistor 34, a vector diagram such as that shown in FIG. 5A is produced at the center frequency $f_0$ to which the band pass filter is tuned. Under these circumstances, the voltage $e_0$ applied to the input of network 20 is displaced 180° with respect to the voltage $e_{180}$ applied to network 22. The output voltage $e_1$ from network 20 has a negative phase shift in accordance with the showing in FIG. 4. Similarly, the output voltage $e_2$ from the network 22 has a positive phase shift in accordance with the curve of FIG. 4. Since the network 20 is tuned to a frequency above the center frequency $f_0$ in an amount equal to the phase shift effected in the opposite sense by the network 22, the sum, $E_0$, of the voltages $e_1$ and $e_2$ will be 90° out of phase with both of the voltages $e_0$ and $e_{180}$. Thus, at the center frequency $f_0$, the voltage $E_0$ will be 90° out of phase with respect to the input signal, $E_{in}$, and its magnitude will be dependent upon the phase shift and attenuation characteristics of the networks 20 and 22. As long as these characteristics are identical above and below the center frequency $f_0$, the relationship shown in FIG. 5A will persist.

With reference now to FIG. 5B, the response of the circuit of FIG. 1 at the frequency $f_0-5\%$ is shown. The phase shift effected by the network 20 is still a negative phase shift, but not as great as that effected at the frequency $f_0$. The voltage $e_2$ at the output of filter network 22, however, is zero since $f_0-5\%$ is the tuned frequency of the filter. Consequently, the voltage $E_0$ at the output of the circuit of FIG. 1 will be equal to the voltage $e_1$ which is shifted in phase from the voltage $E_0$ shown in FIG. 5A by the angle $+\theta$.

In FIG. 5C the response of the circuit of FIG. 1 is shown at the frequency $f_0+5\%$. In this case, the voltage $e_2$ is shifted in phase in a positive direction as it was in the case of FIG. 5A, but not to as great an angle. Furthermore, the voltage $e_1$ under these circumstances is zero so that the voltage $E_0$ at the output of the circuit is equal to $e_2$, which is shifted in phase with respect to the voltage $E_0$ shown in FIG. 5A by an angle of $-\theta$. Thus, the output $E_0$ from the circuit of FIG. 1 will vary from the value of $e_1$ shown in FIG. 5B at a frequency of $f_0-5\%$ to the value $e_2$ shown in FIG. 5C at a frequency of $f_0+5\%$.

When the frequency is greater than $f_0$ but less than $f_0+5\%$ as identified by the line X—X in FIG. 4, the voltages may appear as in FIG. 5D. In this case, the voltage $e_1$ at the output of network 20 is shifted in phase in a negative direction by an amount greater than the phase shift effected at frequency $f_0$. (See FIG. 4.) Its amplitude, however, is decreased due to the fact that the frequency is nearer the center or tuned frequency of network 20. The voltage $e_2$ is shifted in phase in a positive direction and is greater in amplitude than the voltage $e_1$. The vector sum of these, $E_0$, is shifted in phase with respect to its position at $f_0$ (FIG. 5A), but has the same amplitude. For that matter, it will be noted that the amplitude of $E_0$ is constant for all conditions shown in FIGS. 5A–5D.

At frequencies much above and much below $f_0+5\%$ and $f_0-5\%$, both bridge-T networks 20 and 22 will have a transfer function of approximately one and very little attenuation or phase shift will occur. Consequently, the voltage $e_1$ will be equal to and 180° out of phase with respect to the voltage $e_2$ such that the voltage $E_0$ will approach zero. Thus, the overall response of the circuit of FIG. 1 will be as shown in FIG. 6. It will be noted that the amplitude of the output signal $E_0$ is substantially constant between the frequencies $f_0+5\%$ and $f_0-5\%$. Outside of these ranges, however, the amplitude of the signal drops sharply, thereby providing the desired band pass between frequencies $f_0-5\%$ and $f_0+5\%$.

With reference now to FIG. 7, a further embodiment of the invention is shown wherein elements corresponding to those shown in FIG. 1 are identified by like, primed reference numerals. In this case the input transformer 10 is replaced by a phase splitter 44 and the bridge-T filter networks 20' and 22' include resistors 46 connected in series with the inductors 24'.

The phase splitter 44 includes a pair of triodes 48 and 50 having their cathodes connected to ground through the series-connected resistors 52 and 54. Input signals are applied to the grid of triode 48 through capacitor 56, while the grids of each triode are connected to the junction of resistors 52 and 54 through resistors 58 and 60, respectively. The plate of triode 48 is connected to a source of plate voltage, identified as B+, through plate resistor 62. In a similar manner, the plate of triode 50 is connected to the same source of plate voltage through plate resistor 64.

The voltage on the plate of triode 48 will be 180° out of phase with respect to input voltage $E_{in}$; whereas the voltage on the plate of triode 50 will be in phase with the input voltage $E_{in}$. Consequently, the voltage $e_{180}$ will be applied through a capacitor 66 to channel 18' and through the filter network 22'; whereas the voltage $e_0$ will be applied through a capacitor 68 to the channel 16' and through filter network 20'. In series with the resistor 32' in channel 18' is a variable resistor 70 which is included to adjust for slight variations in the characteristics of the components in the network. The output voltage $E_0$ is then applied across the resistor 34' which in this case comprises a grid resistor for an output amplifying triode 72. The cathode of triode 72 is connected to ground through resistor 74 as shown; while the plate of this same triode is connected to the source of plate voltage B+ through resistor 76. The output voltage $E_0$, after amplification, is obtained through coupling capacitor 78 from the plate of triode 72. The operation of the circuit shown in FIG. 7 is identical to that of FIG. 1; however, the addition of phase splitter 44 and amplifying triode 72 provides gain for the signal passing through the filter.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. Band pass filter means comprising an input transformer having a primary winding across which an input signal is applied, a secondary winding for said transformer, a pair of signal channels connected to the respective opposite ends of said secondary winding, a filter network in each of said channels, one network being tuned to a frequency above the center frequency of the band pass filter means and the other network being tuned to a frequency below said center frequency, each of said filter networks including an inductor parallel with two series-connected capacitors, means connecting the junctions of the two capacitors in the respective filter networks to the midpoint of said secondary winding, and means for electrically combining the signals in said channels after passage through said filter networks to produce an output signal which is 90° out of phase with respect to said input signal.

2. Band pass filter means tuned to a center frequency $f_0$ and comprising a pair of signal channels, means for applying an input signal to both of said channels such that the signal in one channel is 180° out of phase with respect to that in the other channel, a bridge-T filter network in each of said channels, one of said networks being tuned to a first frequency above $f_0$ and the other being tuned to a second frequency beneath $f_0$, and means for vectorially adding the signals in said channels after passage through said bridge-T filter networks to produce an output signal.

3. The band pass filter means of claim 2 wherein said first and second frequencies are respectively above and below the frequency $f_0$ in equal amounts, and wherein said input signal is 90° out of phase with respect to said input signal at the frequency $f_0$.

4. Band pass filter means tuned to a center frequency $f_0$ and adapted to pass a band of frequencies equal to $f_0$ plus and minus $x\%$ of $f_0$ where $x$ is a function of the desired band width of the filter, comprising a pair of signal channels, means for applying an input signal to both of said channels such that the signal in one channel is 180° out of phase with respect to the signal in the other channel, a bridge-T filter network in each of said channels, one of said networks being tuned to the frequency $f_0+x\%$ of $f_0$ and the other network being tuned to the frequency $f_0-x\%$ of $f_0$, and means for vectorially adding the signals in said channels after passage through said bridge-T filter networks to produce an output signal which is 90° out of phase with respect to said input signal at the frequency $f_0$.

5. Band pass filter means tuned to a center frequency $f_0$ and comprising a pair of signal channels, means including a phase splitting network for applying an input signal to both of said channels such that the signal in one channel is 180° out of phase with respect to that in the other channel, a bridge-T filter network in each of said channels, one of said networks being tuned to a first frequency above $f_0$ and the other being tuned to a second frequency beneath $f_0$, and means for vectorially adding the signals in said channels after passage through said bridge-T filter networks to produce an output signal which is 90° out of phase with respect to said input signal at frequency $f_0$.

References Cited

UNITED STATES PATENTS

| | | | |
|---|---|---|---|
| 1,882,631 | 11/1932 | Jaurmann | 333—74 |
| 1,918,393 | 7/1933 | Holden | 333—75 |
| 2,167,079 | 7/1939 | Landon | 333—75 |
| 2,173,427 | 9/1939 | Scott | 333—75 |
| 2,676,308 | 4/1954 | Vos | 333—29 |
| 2,990,525 | 6/1961 | Grant | 333—74 |

HERMAN KARL SAALBACH, *Primary Examiner.*

C. BARAFF, *Assistant Examiner.*